United States Patent [19]

King

[11] Patent Number: 4,664,531

[45] Date of Patent: May 12, 1987

[54] DOWNHOLE CLOCK SPRING

[75] Inventor: Lance M. King, Garden Grove, Calif.

[73] Assignee: V. E. Kuster Company, Inc., Long Beach, Calif.

[21] Appl. No.: 797,452

[22] Filed: Nov. 13, 1985

[51] Int. Cl.[4] .............................................. G04B 1/10
[52] U.S. Cl. .................................................. 368/140
[58] Field of Search .................. 368/97, 101, 140–145, 368/154

[56] References Cited

U.S. PATENT DOCUMENTS 3,433,011 3/1969 Iwasawa et al. .................... 368/140

Primary Examiner—Vit W. Miska
Attorney, Agent, or Firm—Grant L. Hubbard

[57] ABSTRACT

A downhole clock spring in the form of an elongate ribbon comprising means connecting one end to a mandrel for driving an escapement, means connecting the other end to a case, the ribbon spring being characterized in that the ribbon is split substantially along the length thereof.

6 Claims, 5 Drawing Figures

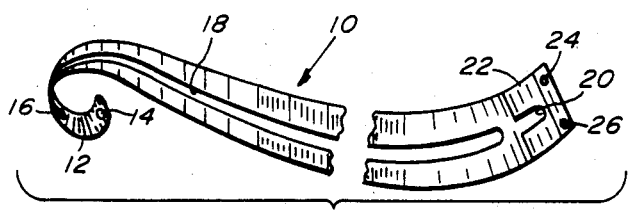
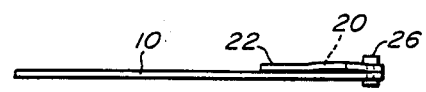
FIG. 1  FIG. 3
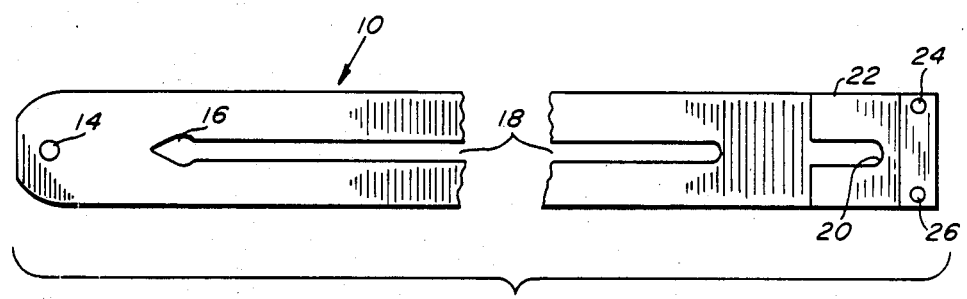
FIG. 2
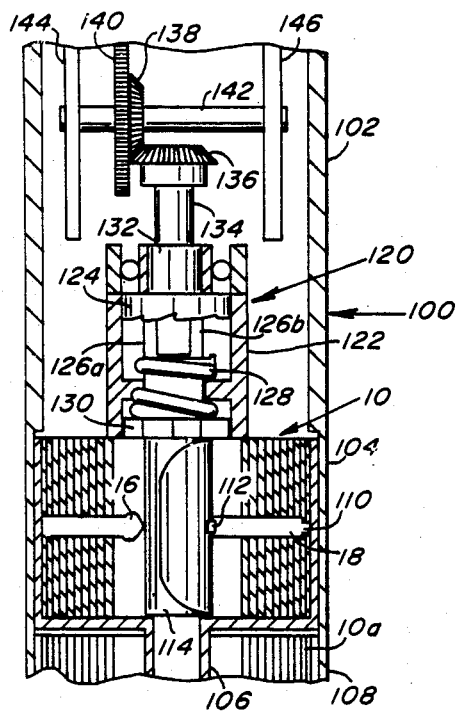
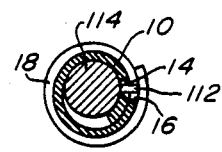
FIG. 4
FIG. 5

DOWNHOLE CLOCK SPRING

FIELD OF THE INVENTION

This invention relates to springs, specifically springs suitable for use in downhole clock or timing devices and to such devices comprising the spring of this invention.

BACKGROUND OF THE INVENTION

Timers and clock mechanisms for downhole use in oil well drilling and logging and in drill stem testing are well-known in the petroleum engineering art.

One of these devices which is the exemplary but nonlimiting example of the type of clock in which the present invention is used is the very well-known KPG type gauge clock. Such clocks are manufactured by Geophysical Research Corporation of Tulsa, Okla., and a similary clock is manufactured by the V. E. Kuster Company of Long Beach, Calif. Other downhole clocks utilizing a similar principle are also in common usage. Since these clocks are so generally known, only a general description is given here.

The clocks to which the present invention relates are in the form of a cylindrical mechanism several inches long and from an inch to two inches in diameter, one and one-fourth being a typical diameter. The clocks comprise a spring, usually a plurality of springs connected in tandem, an escapement mechanism and a gear train. These clocks also include means for winding the spring before each use. The springs are elongate, flat ribbon springs which upon being wound up are wrapped around a central mandrel and upon being released to be unwound cause the central mandrel to rotate. The central mandrel, acting under the torque force from the spring, rotates at a fixed rate which is determined by an escapement mechanism and drives a gear train which drives a scriber, needle or other indicator as a function of time. This type of device is, as will be readily noted, simply a basic, simple mechanical clock, but is uniquely configured to a cylindrical configuration to enable the entire mechanism to be dropped into an oil well or drill stem casing. The clock is usually associated with a pressure of temperature measuring device, or some other measuring instrument. The combined instrument records, usually on a chart, the measured pressure, temperature, etc., as a function of time, the time line being generated by the aforementioned clock. Reference is made to any of the dozens of patients, catalogs and other technical publications of the oil logging and drilling industry for more detailed descriptions of these instruments.

The springs typically utilized in these instruments must be very rugged and capable of heavy duty operation under adverse conditions. These springs may typically be formed of a flat ribbon about two feet long and from one-half to one inch in width with aperatures, etc., at the ends for connecting the spring to a mandrel and a shell inside the cylindrical clock mechanism.

While these instruments are usually quite reliable, they are not without problems in operation. One problem which has been discovered is a tendency of the spring to hang-up upon its self by reason of friction between the layers of the wound spring. This in only momentary and in many applications would be no particular problem. However, where, as in the clocks just described, it is of great importance that the torque on the mandrel and through the escapement to the gear train be uniform, even a momentary pause can result in error or erratic results. These pauses in unwinding usually last no more than a fraction of a second but may introduce uncertainty as to the total output of the measuring device.

The present invention involves the discovery of the source of the problem which has plagued the industry for many years and a solution to the problem.

SUMMARY OF THE INVENTION

A novel spring in the form of an elongate ribbon comprising means for connecting one end to a mandrel for driving an escapement and the other end to a case or shell which is fixed relative to the mandrel or rotates at at different rate which is characterized in that the ribbon is split along the length thereof, typically in the center of the ribbon, such that the net driving force of the single spring is divided. It has been discovered that by this modification, which is relatively simple to make, there is a great improvement in the operation of the spring in that all or virtually all of the tendency to hang-up or pause momentarily is eliminated and a constant, uninterrupted torque is applied to the mandrel at all stages of unwinding of the spring.

BRIEF DESCRIPTION OF THE DRAWING

FIG. 1 is perspective view of the spring of this invention, showing the ends with the center portion cut away to permit emphasis of the end structure.

FIG. 2 is a plan view of one side of the spring shown in FIG. 1, again with the center cut away, showing the detailed configuration of the connecting means at each end of the ribbon spring.

FIG. 3 is an edge view of one edge of one end, the left end as depicted, of the spring shown in FIG. 2 showing the structure which permits connection of the right end of the spring to a casing or shell.

FIG. 4 is a fragmented view in cross section of only the mandrel portion of the spring winding mechanism with the spring attached thereto, taken near the center of the longitudinal dimension of a mandresl to which the spring is connected.

FIG. 5 is a side view in partial cross-section of that portion of the conventional downhole clock previously described which includes the spring of this invention, showing only part of the gear train which is driven by the spring and escapement.

DESCRIPTION OF THE PREFERRED EMBODIMENT

The preferred embodiment of the present invention is shown in FIG. 1 in the form of an elongate ribbon spring having a center slit portion removed therefrom. The ribbon spring 10 has formed at a proximal or internal end 12, shown at the left, an aperture 14 for receiving and being connected by a pin on the mandrel. The pin also extends through an opening 16 which is inwardly spaced, along the length of the spring, from the proximal end 12, which opening 16 forms the end of a slit 18 which extends longitudinally along the length of the ribbon and is preferably midway between the edges of the ribbon. At the distal or outer end of the ribbon spring, means are provided for connecting this distal end to the outer casing or shell. A notch 20 is formed in a leaf 22 secured by pins 24 and 26 to the distal end of the ribbon, as best shown in FIGS. 2 and 3. It is to be clearly understood that the connection means described are convenient and conventional, but any connection means may be used.

The proximal end connection to the mandrel is shown in FIG. 4, wherein the pin 112 on mandrel 114 extends through both the connecting aperture 14 and the aperture 16 which begins the slit 18. It will be noted that by beginning the slit at this portion of the ribbon, as shown at 16, generally spaced about $\pi D$ inwardly, longitudinally from connecting aperture, D being the diameter of the first wrap of the spring on the mandrel, the connecting pin 112 extends through two, or possibly three or more, wraps of the spring on the mandrel without distorting the ribbon spring.

Referring briefly to FIG. 5 which depicts a portion of a conventional RPG type down-hole clock, except that it includes the spring just described. The clock 100, in very general terms, comprises a cylindrical housing 102 which may have a thinner walled portion as shown at 104 and may, optionally, include a plurality of mandrel and spring combinations as indicated generally at 106 and 108 holding a second spring 10a. A series of three springs connected in tandem such that they unwind serially thus being, in effect, one spring of three times the length of one ribbon. This is, of course, conventional and not part of this invention per se so no extended discussion is warranted.

The clock of the invention comprises one or more springs 10 each connected by any suitable means such as pin 110 on the shell and a pin 112 on the mandrel 114 which drives, directly or indirectly, the clutch mechanism generally shown at 120. Any clutch mechanism may be used, but that commonly used includes a sleeve 122, a ratchet mechanism 124, drive dogs or pins 126a and 126b, all of which may be secured together by a spring 128 and fastener 130. Some detail is omitted because this is a conventional clutch, but it will be seen that the escapment drives the shaft assembly 132-134 which is suitably supported in bearings and, in turn, drives the gear train comprising gears 136, 138 and 140, which is only the beginning of the conventional gear train, the gears being supported in any suitable frame such as shown at 144 and 146, drive a conventional balance wheel escapement.

The combination of the spring in a clock has two significant advantages over the conventional spring. First, distortion of the spring is avoided by providing a slot in the center of the spring through which the connecting pin on the mandrel may extend. This result is desirable, but certainly would not suggest slitting substantially the entire length of the spring, i.e. all of the spring but the proximal and distal end portions which function as connecting means. It was a most unexpected and startling advantage to discover that by forming the ribbon spring with a slit, all of the tendency to hang-up and pause during unwinding of the spring disappeared!

If there is any tendency to hang-up, it is not observable either in operation or in result. It is not known for sure, but it is considered likely that there is some synergistic effect in having the two portions of the ribbon unwind simultaneously such that, apparently, an unwinding torque is presented at all times by one or both of the portions of the slit ribbon spring. A result not before achievable has, accordingly, been accomplished, namely, a clock which has no tendency to pause and jump as the spring unwinds.

INDUSTRIAL APPLICATION

This invention finds application in the oil drilling and production industries.

What is claimed is:

1. A downhole clock spring in the form of an elongate ribbon comprising means for connecting one end to a mandrel for driving an excapement, means for connecting the other end to a case or shell which is fixed relative to the mandrel or rotates at at different rate than the mandrel, the ribbon spring being characterized in that the ribbon is split substantially along the length thereof.

2. The spring of claim 1 wherein the slit is in the center of the ribbon, such that the net driving force of the single spring is divided generally equally between the two sides of the spring.

3. The spring of claim 2 wherein the slit extends to within a distance of about $\pi D$ of the means for connecting the proximal end of the spring to the mandrel, D being the diameter of the first wrap of the spring about the mandrel.

4. In a downhole clock of the type which includes a spring, an escapement and a spring, the improvement wherein the spring comprises an elongate ribbon comprising means for connecting one end to a mandrel for driving an escapement, means for connecting the other end to a case or shell which is fixed relative to the mandrel or rotates at at different rate than the mandrel, the ribbon spring being characterized in that the ribbon is split substantially along the length thereof.

5. The clock of claim 4 wherein the slit in the spring is in the center of the ribbon, such that the net driving force of the single spring is divided generally equally between the two sides of the spring.

6. The clock of claim 4 wherein the means for connecting one end to the mandrel comprises a pin extending from the mandrel and wherein the slit in the ribbon spring extends to within a distance of about $\pi D$ of the means for connecting the proximal end of the spring to the mandrel, D being the diameter of the first wrap of the spring about the mandrel to thereby permit the pin to extend through at least two thickness of the spring without distorting the spring.

* * * * *